United States Patent
Höchsmann et al.

(10) Patent No.: US 7,799,253 B2
(45) Date of Patent: Sep. 21, 2010

(54) METHOD OF, AND APPARATUS FOR, APPLYING FLOWABLE MATERIAL ACROSS A SURFACE

(75) Inventors: Rainer Höchsmann, Genderkingen (DE); Martin Stachulla, Augsburg (DE); Bernd Krabler, Thierhaupten (DE); Stefan Hühn, Augsburg (DE); Alexander Müller, Königsbrunn (DE); Frank Sonntag, Kissing (DE)

(73) Assignee: Prometal RCT GmbH, Augsburg (DE)

(*) Notice: Subject to any disclaimer, the term of this patent is extended or adjusted under 35 U.S.C. 154(b) by 184 days.

(21) Appl. No.: 12/094,959

(22) PCT Filed: Nov. 21, 2006

(86) PCT No.: PCT/DE2006/002047

§ 371 (c)(1),
(2), (4) Date: Sep. 10, 2008

(87) PCT Pub. No.: WO2007/059743

PCT Pub. Date: May 31, 2007

(65) Prior Publication Data

US 2009/0004380 A1    Jan. 1, 2009

(30) Foreign Application Priority Data

Nov. 25, 2005   (DE) .................. 10 2005 056 260

(51) Int. Cl.
*B22F 3/00*       (2006.01)
*B05D 1/12*      (2006.01)

(52) U.S. Cl. .................. 264/113; 264/497; 118/308; 427/180

(58) Field of Classification Search .............. 427/180, 427/202; 118/308; 264/112, 113, 460, 497
See application file for complete search history.

(56) References Cited

U.S. PATENT DOCUMENTS

| | | | | |
|---|---|---|---|---|
| 5,348,693 | A | * | 9/1994 | Taylor et al. .............. 264/401 |
| 5,730,925 | A | * | 3/1998 | Mattes et al. .............. 264/497 |
| 7,137,431 | B2 | | 11/2006 | Ederer et al. |

(Continued)

FOREIGN PATENT DOCUMENTS

DE           10047614 A1      4/2002

(Continued)

OTHER PUBLICATIONS

The International Bureau of WIPO, International Preliminary Report on Patentability for PCT/DE2006/002047, Jul. 17, 2008.

*Primary Examiner*—Frederick J Parker
(74) *Attorney, Agent, or Firm*—Cahn & Samuels, LLP

(57) ABSTRACT

The invention relates to a method and a device for applying for a flowable material, especially a particulate material, in individual superimposed layers across a support (50), the flowable material being first filled from a stationary feed station (10) into a storage container (24) of an application device. In the application device (30), which travels back and forth across the support, the flowable material is distributed inside the storage container across the entire length of the device and is then metered through a slot into a metering shaft in such a manner that the filling level in the metering shaft remains constant during application of the flowable material from the metering shaft onto the support.

17 Claims, 5 Drawing Sheets

U.S. PATENT DOCUMENTS

Figure 1:
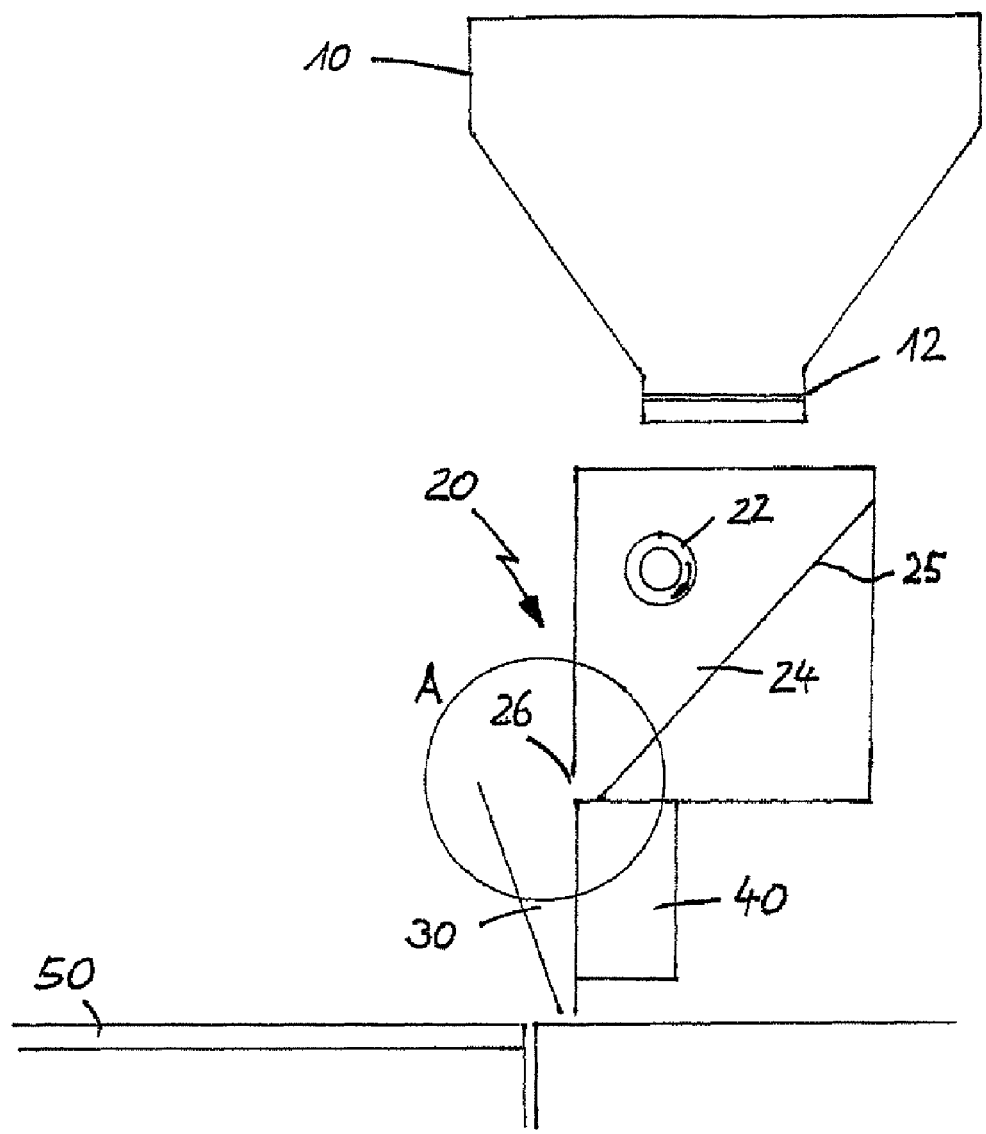

| | | |
|---|---|---|
| 2002/0113331 A1 | 8/2002 | Zhang et al. |
| 2005/0015175 A1 | 1/2005 | Huang |
| 2006/0105102 A1 | 5/2006 | Hochsmann et al. |

FOREIGN PATENT DOCUMENTS

| | | | |
|---|---|---|---|
| DE | 10216013 A1 | | 10/2003 |
| WO | 9534468 A1 | | 12/1995 |
| WO | 00/78485 | * | 12/2000 |
| WO | 0078485 A2 | | 12/2000 |
| WO | 2004/054743 | * | 7/2004 |
| WO | 2004054743 A1 | | 7/2004 |
| WO | 2005089090 A2 | | 9/2005 |

* cited by examiner

Detail A

Detail A

Detail A

Detail A

US 7,799,253 B2

METHOD OF, AND APPARATUS FOR, APPLYING FLOWABLE MATERIAL ACROSS A SURFACE

This application is the National Stage of International Application No. PCT/DE2006/002047, filed on Nov. 21, 2006, which claimed the benefit of Application No. 10 2005 056 260.4 filed in Germany on Nov. 25, 2005, which are hereby both incorporated by reference. The International Application No. PCT/DE2006/002047 was published on May 31, 2007.

I. FIELD OF INVENTION

The invention relates to a method of, and an apparatus for, applying flowable material, in particular particulate material, across the surface of a substrate in individual layers located one above the other.

II. BACKGROUND OF THE INVENTION

Such methods and apparatuses are usually used in order to produce three-dimensional objects in layers. A three-dimensional object is produced here by selectively solidifying successive layers of a powdery material at the appropriate locations of a respective cross-section of the object, for example by selectively applying a binder to the respective layer and setting the binder, by introducing a binder into the respective layer and selectively setting the binder, or by subjecting the respective layer selectively to the action of a laser beam.

WO 00/78485 A2 discloses a coating device for applying flowable material across the surface of a substrate in individual layers one above the other. As can be seen from FIG. 4, the coating device 3 has a metering shaft which can be displaced back and forth over the substrate, having two spaced-apart walls 4, 5 which extend over the entire width of the substrate to which the layers are applied and, between them, form a shaft 6 which is open toward the top and the bottom. At their bottom end, adjacent to the surface 1, the walls 4, 5 have smoothing elements 7, 8, which may be designed, for example, as rubber lips or as metal blades. As an alternative, the smoothing elements are formed from ceramic material. At its two opposite ends, or at one end, the coating device 3 is guided in the frame of the device and driven so as to allow back and forth movement of the metering shaft over the entire surface 1, and thus application of the respective layer, in a predetermined layer thickness, to the substrate. A stationary supply container 9 is provided which is borne by the machine frame 10, and likewise forms a shaft 13 which is open toward the top and the bottom.

During operation, powder is introduced, in an end position of the coating device 3, into the shaft 6 of the latter from the stationary supply container. When the coating device 3 is then moved away, self-levelling of the flowable powder in the supply container takes place by way of the pile which builds up. If the supply container is very wide, and also relatively narrow in terms of depth, it may be the case that the powder has to be distributed in the supply container by means of vibrators or of a distributing worm. This is the case, in particular, when use is made of powder with poor flow properties, in which case the pile is very steep.

Mechanical distribution by means of a distributing worm or of vibrators means that the powder in the supply container is subject to very different levels of compaction along the supply container. This results in locally different metering quantities in the displaceable supply container of the coating device, metering taking place in the end position of the same, and this may ultimately result in locally different levels of compaction in the building zone and thus in quality fluctuations in respect of strength, finish and component compaction. In order to avoid inhomogeneity, when the supply container is refilled, on account of residues which have a density which differs from that of the newly introduced powder, the supply container is usually completely emptied and/or zeroed. However, this produces further quantities of waste.

III. SUMMARY OF THE INVENTION

The object of the invention is to provide a method and an apparatus which make it possible to realize largely homogenous coating of the substrate over the surface thereof.

According to the invention, the metering shaft of an application apparatus which can be displaced back and forth, and from which the flowable material flows onto the substrate or onto the layer previously applied to the substrate, is filled continuously with flowable material, from an integrated charging container, at any point in time during the coating travel such that the material in the metering shaft remains at a predetermined filling level during the coating travel. The charging container, which is integrated in the displaceable application apparatus, can easily be refilled from a stationary material supply.

A further advantage of the invention is that the charging container can be straightforwardly refilled, for example, directly from a conveyor worm because, on account of the charging container being interposed between the stationary supply station and the metering shaft, there is no need for the material to be distributed in the metering shaft already as it is being transferred from the supply station. Rather, according to the invention, the material can be transferred from the supply station into a locally delimited region of the charging container, in which the material can then be distributed on a preliminary basis by means of a suitable distributing arrangement such as a conveyor worm, which is provided in the charging container itself.

A further advantage is that, on account of the reduced container volumes, the quantities of powder which have to be supplied are reduced. It is thus possible to reduce quantities of waste for, in particular, types of powder of limited service life. When powder types are changed over, the quantities of waste produced are likewise reduced.

Since uniform distribution of the powder material in the metering shaft means that the levels of compaction do not differ along the metering shaft, it is also no longer the case, on account of the invention, that the metering shaft has to be completely emptied prior to powder being refilled, as a result of which additional quantities of waste can be avoided.

IV. BRIEF DESCRIPTION OF THE DRAWINGS

Figure 2:
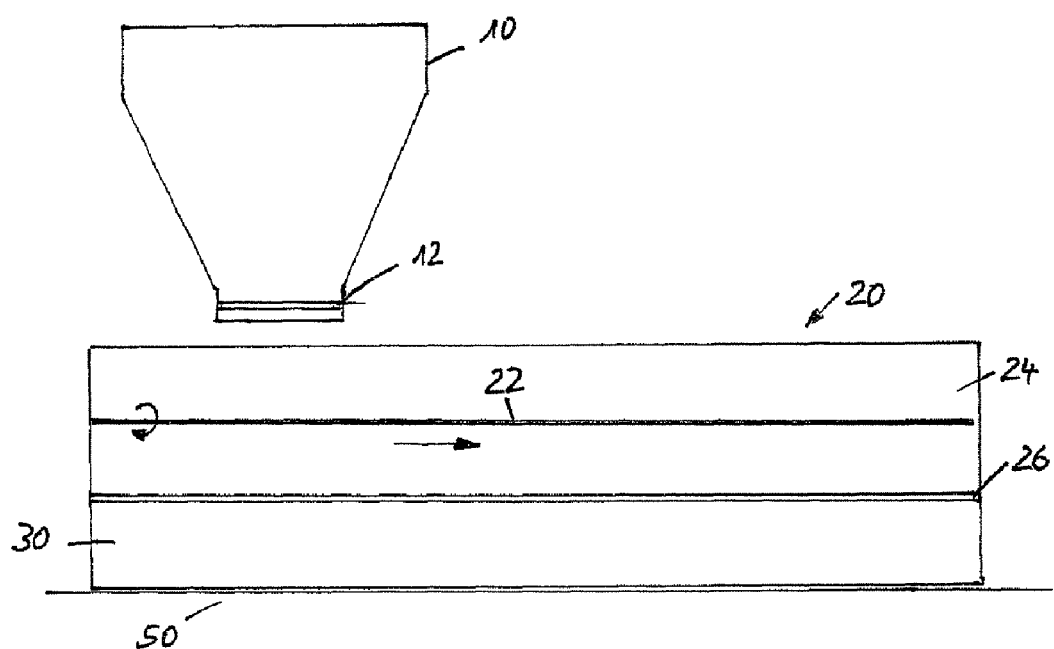
Figure 3A:
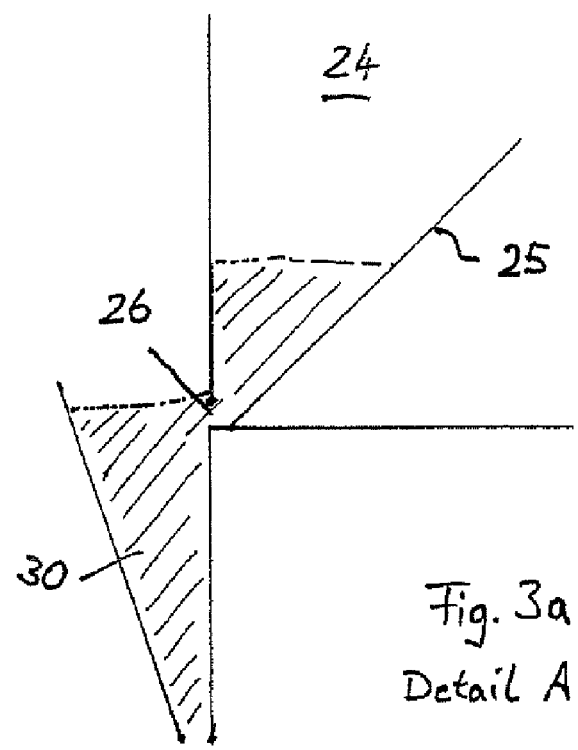
Figure 3B:
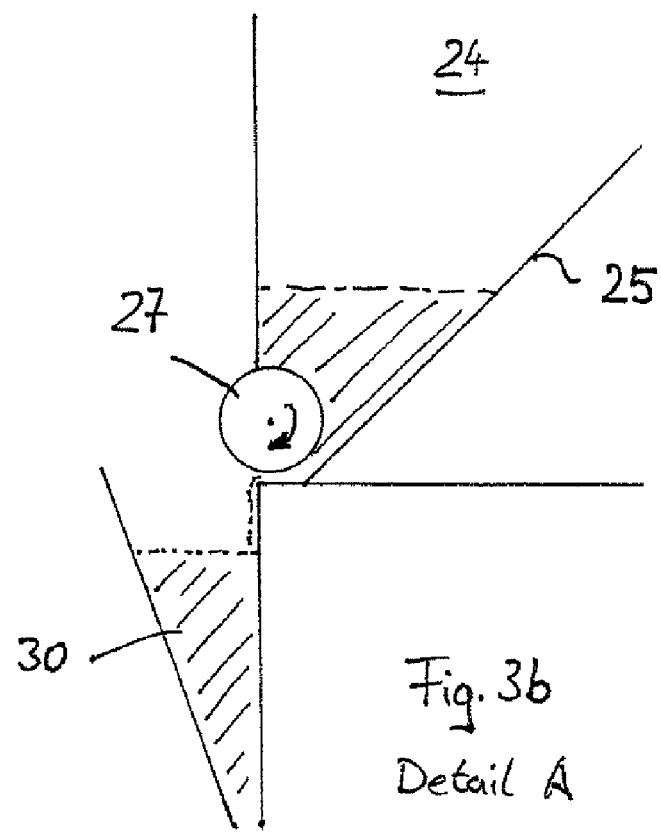
Figure 3C:
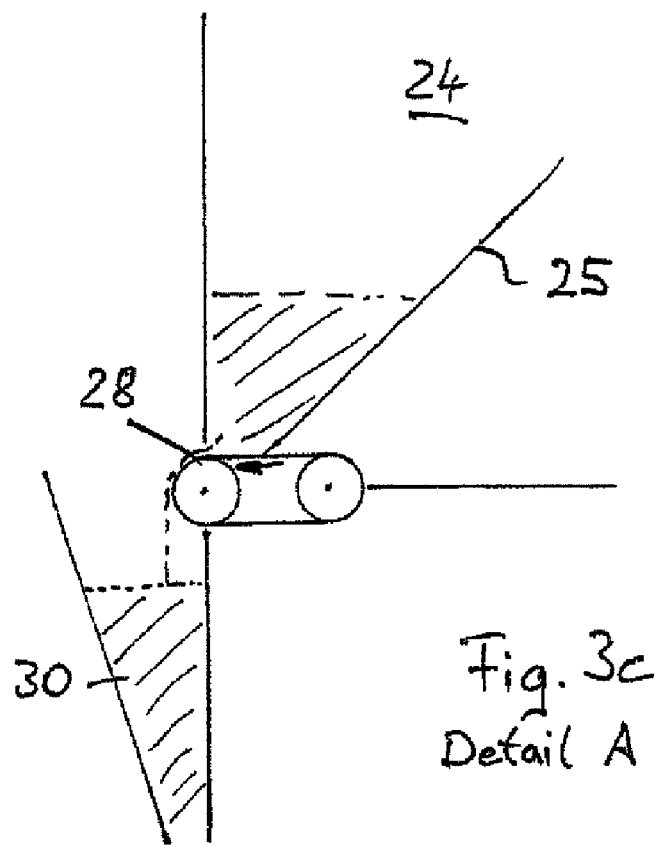
Figure 3D:
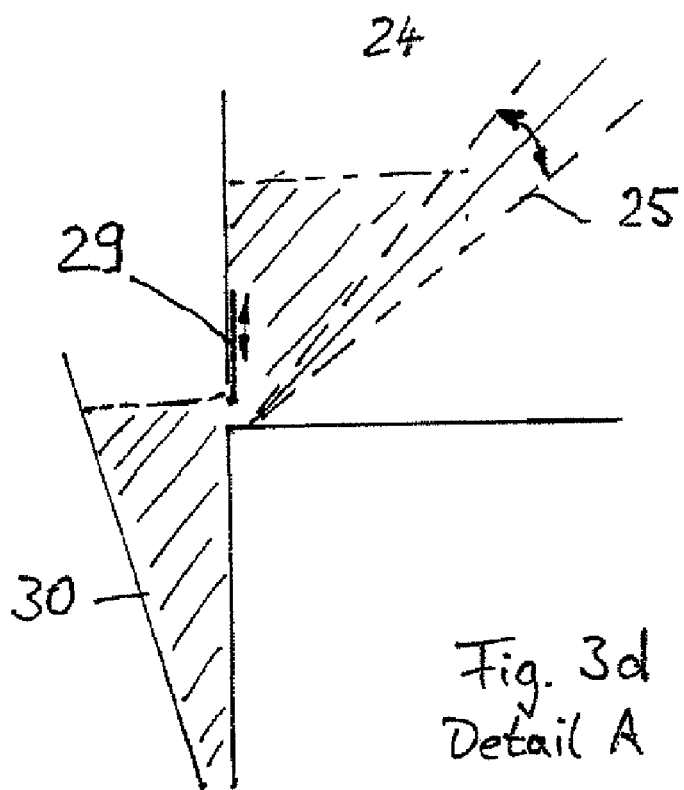
Figure 4:
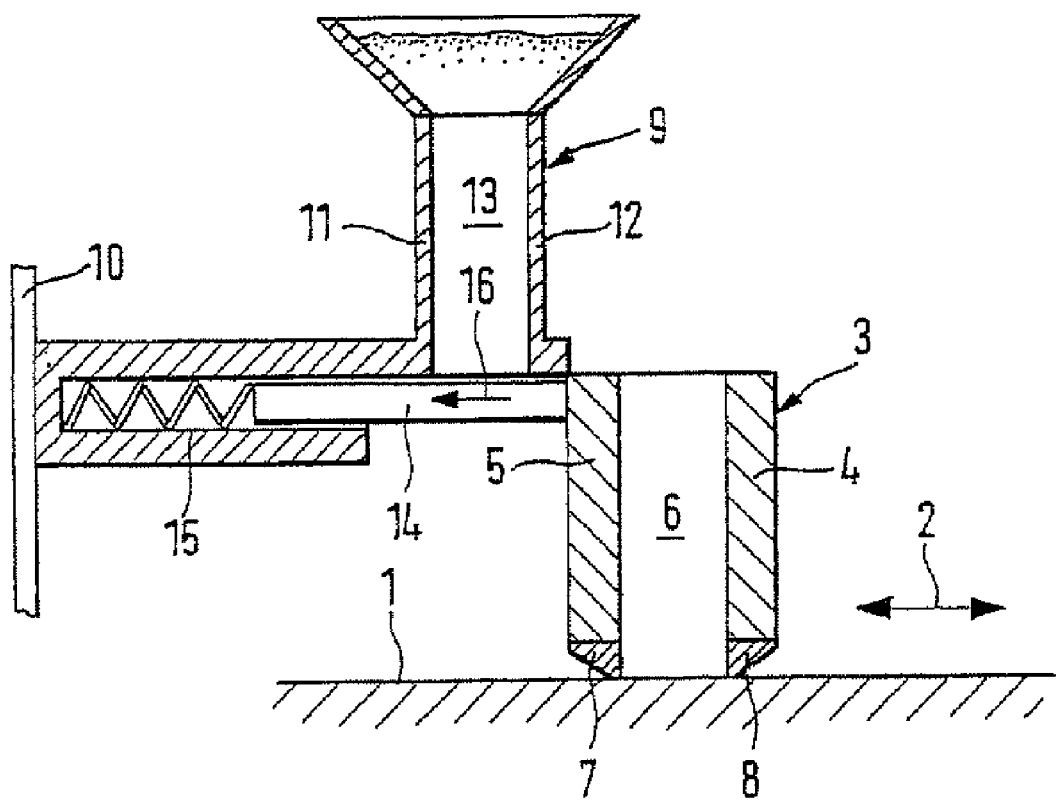

The invention will be described hereinbelow by way of preferred embodiments and with reference to the drawings, in which:

FIG. 1 shows a schematic illustration of a preferred embodiment of an application apparatus according to the invention together with a stationary material-supply container and a surface to which the material is to be applied in a uniform layer, FIG. 2 shows a schematic illustration of the elements from FIG. 1 as seen from the side, FIG. 3*a* shows an enlarged view of detail A of the preferred embodiment from FIG. 1, FIG. 3*b* shows an enlarged view of detail A from FIG. 1, albeit according to another embodiment of the invention, FIG. 3c shows an enlarged view of detail A from FIG. 1, albeit according to a further embodiment of the invention, FIG. 3d shows an enlarged view of detail A from FIG. 1, albeit according to yet a further embodiment of the invention, and FIG. 4 shows a conventional application apparatus together with a stationary material-supply container and a surface to which the material is to be applied.

V. DETAILED DESCRIPTION OF INVENTION

According to the invention, for the purpose of applying flowable material, in particular particulate or powdery material, across the surface of a substrate 50 in individual layers located one above the other, the flowable material is introduced, from a stationary material supply 10, into a displaceable application apparatus 20 which can be moved back and forth over the substrate 50 and from which the material introduced is discharged downward in continuous layers and distributed uniformly. The application apparatus 20 here has a charging supply, from which a metering shaft is filled such that the filling height of the flowable material in the metering shaft remains constant during the movement of the application apparatus.

In order, for example in the case of rapid prototyping applications, to apply one above the other uniform layers in which respective cross sections of the three-dimensional object which is to be produced are then selectively bonded or set, the layer-application conditions are kept constant in the case of the method according to the invention. These conditions are predetermined, in particular, by the filling height and the type of material provided in the metering shaft. As a result of uniform and constant distribution of the flowable material in the metering shaft, the flowable material can always be applied in layer form to a substrate under uniform pressure, and in the uniform quantity, at the discharge opening of the metering shaft. In order to achieve these conditions, the application apparatus 20 according to the invention has a charging container 24, a metering shaft 30 and preferably a vibrating means 40.

In the preferred embodiment, the charging container 24 is an elongate container of rectangular cross section which is open at the top. Along the bottom periphery of that longitudinal wall of the charging container 24 which leads or trails during the coating travel, a discharge slot 26 is formed over the entire length. The base wall 25 of the rectangular container preferably slopes down obliquely in the direction of the slot 26. In this way, the space in which the flowable material can be accommodated forms a hopper-like cross section. This cross section is preferably the same over the entire length of the charging container, as a result of which it is better possible to ensure that the material introduced is utilized.

The charging container 24 is arranged above a metering shaft 30, and the slot 26 is arranged such that the flowable material can flow through it into the metering shaft 30. The metering shaft 30 likewise preferably has a hopper-like cross section which is open at the top, a discharge slot, through which the flowable material can flow onto a substrate 50 to which a material layer is to be applied, being formed at the bottom end of the metering shaft.

Both the charging container 24 and the metering shaft 30 are at least long enough to span the entire width of the substrate 50.

In the preferred embodiment, furthermore, a vibrating means 40 is provided to the side of the metering shaft 30 and beneath the charging container 24. The vibrating means 40 may be, for example, a vibrating beam. By virtue of both the metering shaft 30 and the charging container 24 being made to vibrate, it can be ensured that the flowable material is distributed uniformly in the metering shaft 30 and/or the supply container 24 and can flow uniformly out of the same.

In an end position of the application apparatus, above one end of the substrate 50, it is possible to provide a means of filling the charging container 24 with flowable material. For this purpose, it is possible, as depicted in FIGS. 1 and 2, to provide a stationary material-supply container 10, which contains a quantity of flowable material which is sufficient in order for it to be possible for at least the layers which are necessary for producing a certain object to be applied to the substrate. The position of this stationary material-supply container 10 relative to the longitudinal extent of the charging container 24 can be freely selected. According to the preferred embodiment, this position is in the vicinity of one lateral end of the charging container 24, as is illustrated in FIG. 2. The discharge of the flowable material from the material-supply container 10 can be controlled, for example, via a valve 12. As soon as flowable material has been introduced from the stationary material-supply container 10 into the charging container 24, it is possible, in the preferred embodiment, for a distributor 22, for example, a worm, in the charging container 24 to distribute the flowable material over the entire length of the charging container 24.

As an alternative, instead of the stationary material-supply container 10, it is also possible to provide a conveying belt or just a feeding worm for feeding flowable material.

However, it is also possible for the flowable material to be distributed in the charging container 24, over the length thereof, as it is being transferred from the supply container 10. It is then possible to dispense with a distributor in the charging container itself. Depending on the length/width of the substrate, and thus of the charging container and the height thereof, it may also be sufficient to build up the material, at a locally delimited location in the charging container, in the form of a pile, of which the material is then distributed, for example by vibration, over the charging container, in which case the discharge slot 26 always remains filled with material. The quantity of flowable material which has been introduced into the charging container 24 from the material-supply container 10 should be at least sufficient for it to be possible, while maintaining a constant filling height in the metering shaft 30, for at least one layer to be applied to the surface 50 during a back and forth movement of the application apparatus 10.

A special aspect of the invention is the fact that it is possible for the filling height of the metering shaft, from which the material flows onto the surface, to be kept constant, or at least more or less constant, during the application, in order that the layer is rendered uniform and essentially free of local differences in density. Those embodiments of the application apparatus which are illustrated in FIGS. 3a to 3d, in particular in respect of the configuration of the discharge slot 26 through which the flowable material flows into the metering shaft 30 from the charging container 24, constitute examples of structures with the aid of which it is possible to achieve a constant filling height in the metering shaft 30.

FIG. 3a shows a straightforward, self-regulating embodiment. The flowable material in the application apparatus 20 is distributed uniformly within the charging container and the metering shaft on account of the vibration of the vibrating means 40. Since the width of the slot 26 is selected such that at least as much material flows out of the charging container 24, through the slot 26, into the metering shaft 30 as flows onto the surface 50 from the metering shaft 30, the filling level in the metering shaft is one which extends approximately up to the top boundary edge of the slot 26. The material in the metering shaft 30 thus blocks the slot 26 and thus the follow-up flow of material from the charging container 24. As soon as material flows out of the metering shaft in the downward direction onto the surface 50, however, material can flow out of the charging container 24 into the metering shaft 30. In this way, it is only ever the case that precisely as much material will flow into the metering shaft as also flows out of the same.

FIG. 3*b* shows an embodiment in which in particular a roller 27 which can be driven in rotation is installed over the entire length of the slot 26. The gap between the base of the charging container 24 and the roller 27 is smaller than the slot from which material can flow out of the metering shaft 30 onto the surface 50. The filling height would thus decrease when a material layer is applied to the surface 50. By virtue of the roller 27 being driven in the direction of the arrow depicted (see FIG. 3*b*), it is possible to regulate the flow quantity between the base of the charging container and the roller 27 in particular in dependence on the speed of travel of the application apparatus. It is thus possible for the quantity which flows out of the metering shaft to be coordinated with the quantity of material which flows past the roller 27 into the metering shaft and, in this way, to keep the filling height in the metering shaft constant.

FIG. 3*c* illustrates a further embodiment in the region of the slot 26. This embodiment is comparable with that from FIG. 3*b*, the difference being that, in this case, the quantity of material which flows out of the charging container 24 into the metering shaft 30 is regulated by means of a driven belt 28 which extends along the base of the charging container 24, over the entire length of the slot 26, and drives the flowable material in order for it to flow out through the slot 26. Here too, the slot 26 is smaller than the opening from which the material flows out of the metering shaft 30. In this way, it is possible to regulate the throughflow quantity flowing through the slot 26 such that the filling height in the metering shaft 30 remains constant. It is also possible, in the case of this embodiment, to dispense with the oblique base wall 25 if the belt 28, in this case, replaces the entire width of the base of the charging container, as a result of which it would be ensured that the material which is remote from the slot 26 in the charging container 24 is also conveyed through the slot 26 by the belt 28.

Both in the case of the embodiment according to FIG. 3*b* and in the case of the embodiment according to FIG. 3*c*, it is possible to use a sensor or a row of sensors (not illustrated) for sensing the actual filling height in the metering shaft. The sensor-output signal corresponding to the filling height can then be passed on to a control unit (not illustrated), which sets that speed of the roller 27 or of the belt 28 which is necessary in order to maintain a constant filling height in the metering shaft 30.

FIG. 3*d* illustrates yet a further embodiment. It is possible here to use a slide 29 to adjust the height, and thus the width, of the slot 26, in order to regulate the throughflow quantity of the material which flows into the metering shaft from the charging container. It is thus possible, using the principle of the embodiment from FIG. 3*a*, to adapt the quantity flowing through the slot, for example, to different materials and also to different thicknesses of the layers applied to the surface 50. On the other hand, it may be possible for the quantity flowing through the slot 26 to be actively regulated during the application of a layer, in order to keep the filling height in the metering shaft constant. Here too, it is possible to provide a corresponding sensor which senses the filling height and passes this on to a control unit.

Moreover, it may be advantageous for the base wall 25 of the charging container, this wall sloping down obliquely in the direction of the slot 26, to have an adjustable angle of inclination in order for it to be possible for the application apparatus to be adapted, for example, to different flowable materials and quantities of material.

The invention claimed is:

1. A method of applying flowable particulate material across the surface of a substrate in individual superimposed layers to produce a three-dimensional object by selective solidification of the successive layers, in which method the flowable particulate material is introduced, from a material supply which has been introduced into a charging container, into an elongate, cross-sectionally hopper metering shaft over the entire length thereof, the metering shaft is moved back and forth over the substrate and, during the movement, the particulate material introduced is discharged downward in a continuous layer from a slot on the underside of the metering shaft and distributed uniformly, wherein the supply of flowable particulate material is uniformly distributed in the charging container, the charging container is moved over the substrate together with the metering shaft and, during the movement, the metering shaft is filled with flowable particulate material from the material supply such that the filling height in the metering shaft remains constant.

2. A method of applying flowable particulate material across a surface of a substrate in individual superimposed layers to produce a three-dimensional object by selective solidification of the successive layers, said method comprising:
   uniformly distributing flowable particulate material within a charging container,
   transferring flowable particulate material from the charging container to a metering shaft,
   discharging flowable particulate material downward in a continuous layer onto a surface of a substrate forming a uniform surface by moving the metering shaft and the charging container back and forth together over the surface of the substrate;
   while the metering shaft is depositing flowable particulate material, refilling the metering shaft to maintain a constant filling height of flowable particulate material in the metering shaft by transferring flowable particulate material from the charging container to the metering shaft.

3. An application apparatus for applying flowable particulate material across a surface of a substrate in individual superimposed layers, said apparatus comprising:
   an elongated metering shaft having
      a pair of opposing walls angled relative to each other,
      an open top formed between said pair of opposing walls, and
      a slot along a bottom of said measuring shaft between said pair of opposing walls, the slot is narrower between said opposing walls than the opening;
   a charging container which is open in an upward direction away from said metering shaft and located above said metering shaft, said charging container having a slot in a side wall proximate to a bottom of said charging container with a cavity from the slot to a top of said charging container, the slot is in communication with the open top of said metering shaft;
   said charging container includes a distribution device in the cavity spaced from the slot of said charging container;
   said metering shaft and said charging container move together across a substrate and form a pathway for flowable particulate material to travel and be deposited on the substrate from said metering shaft while maintaining a substantially constant filing height of flowable particulate material in said metering shaft.

4. An application apparatus for applying flowable particulate material across a surface of a substrate in individual superimposed layers, said apparatus comprising:
- an elongated metering shaft having
  - a pair of opposing walls angled relative to each other,
  - an open top formed between said pair of opposing walls, and
  - a slot along a bottom of said measuring shaft between said pair of opposing walls, the slot is narrower between said opposing walls than the opening;
- a charging container which is open in an upward direction away from said metering shaft and located above said metering shaft, said charging container having a slot in a side wall proximate to a bottom of said charging container with a cavity from the slot to a top of said charging container, the slot is in communication with the open top of said metering shaft;
- said metering shaft and said charging container move together across a substrate and form a pathway for flowable particulate material to travel and be deposited on the substrate from said metering shaft while maintaining a substantially constant filing height of flowable particulate material in said metering shaft.

5. The apparatus according to claim 4, further comprising a vibrating beam below said charging container.

6. The apparatus according to claim 5, wherein said vibrating beam is along a side of said metering shaft, and
a means for maintaining the substantially constant filling height of the flowable particulate material during use of the apparatus is a top boundary of the slot of said charging container.

7. The apparatus according to claim 4, wherein said charging container includes a base wall dividing said charging container into two areas and obliquely descending to said slot at an angle.

8. The apparatus according to claim 7, wherein the angle of said base wall is adjustable.

9. The apparatus according to claim 4, wherein said charging container includes a roller along a length of the slot of said charging container, said roller arranged to rotate in the cavity of said charging container to discharge flowable particulate material through the slot to said metering shaft.

10. The apparatus according to claim 9, further comprising
a control unit connected to said roller, and
a fill sensor in said metering shaft connected to said control unit; and
wherein said control unit operates said roller to maintain a substantially constant height of flowable particulate material in said metering shaft.

11. The apparatus according to claim 4, wherein said charging container includes a driven belt arranged to move flowable particulate material from said charging container through the slot to said metering shaft.

12. The apparatus according to claim 11, further comprising
a control unit connected to said driven belt, and
a fill sensor in said metering shaft connected to said control unit; and
wherein said control unit operates said driven belt to maintain a substantially constant height of flowable particulate material in said metering shaft.

13. The apparatus according to claim 11, wherein said driven belt is the bottom of said charging container.

14. The apparatus according to claim 4, wherein said charging container includes a door in sliding engagement with said side wall with the slot and orientated to move over the slot of said charging container to adjust a height of the slot.

15. The apparatus according to claim 4, wherein said charging container includes a base wall extending upward from a bottom of said charging container at a point spaced from said slot and tapering the cavity for flowable particulate material toward the slot.

16. The apparatus according to claim 4, wherein one side wall of said metering shaft is aligned with said side wall with the slot of said charging container.

17. The apparatus according to claim 4, wherein
said charging container includes a distribution device in the cavity spaced from the slot of said charging container;
said charging container receives a material supply of the particulate material; and
the slot discharges particulate material from the material supply into said metering shaft.

* * * * *